United States Patent
Straw et al.

(10) Patent No.: US 10,493,559 B2
(45) Date of Patent: Dec. 3, 2019

(54) METHOD AND APPARATUS FOR LASER MACHINING

(75) Inventors: Marcus Straw, Portland, OR (US); David H. Narum, Banks, OR (US); Milos Toth, Portland, OR (US); Mark Utlaut, Scappoose, OR (US); Guido Knippels, Schijndel (NL); Gerardus Nicolaas Anne Van Veen, Waalre (NL)

(73) Assignee: FEI Company, Hillsboro, OR (US)

( * ) Notice: Subject to any disclaimer, the term of this patent is extended or adjusted under 35 U.S.C. 154(b) by 469 days.

(21) Appl. No.: 13/003,513

(22) PCT Filed: Jul. 8, 2009

(86) PCT No.: PCT/US2009/049961
§ 371 (c)(1),
(2), (4) Date: Apr. 29, 2011

(87) PCT Pub. No.: WO2010/006067
PCT Pub. Date: Jan. 14, 2010

(65) Prior Publication Data
US 2012/0103945 A1    May 3, 2012

Related U.S. Application Data

(60) Provisional application No. 61/079,304, filed on Jul. 9, 2008.

(51) Int. Cl.
*B23K 26/03* (2006.01)
*B23K 26/08* (2014.01)
(Continued)

(52) U.S. Cl.
CPC .......... *B23K 26/03* (2013.01); *B23K 26/0622* (2015.10); *B23K 26/0853* (2013.01);
(Continued)

(58) Field of Classification Search
CPC .. B23K 26/03; B23K 26/063; B23K 26/0853; B23K 26/14; B23K 26/1423; B23K 26/1429
(Continued)

(56) References Cited

U.S. PATENT DOCUMENTS 3,303,319 A * 2/1967 Steigerwald ............. 219/121.17
4,874,947 A * 10/1989 Ward et al. ........................ 850/1
(Continued)

FOREIGN PATENT DOCUMENTS

CN       1125917      7/1996
CN       1406452      3/2003
(Continued)

OTHER PUBLICATIONS

Handbook of Laser-Induced Breakdown Spectroscopy, Cremers and Radziemshi, p. 46 (Wiley 2006).*
(Continued)

*Primary Examiner* — Ibrahime A Abraham
*Assistant Examiner* — Frederick F Calvetti

(57) ABSTRACT

Laser processing is enhanced by using endpointing or by using a charged particle beam together with a laser. Endpointing uses emissions, such as photons, electrons, ions, or neutral particles, from the substrate to determine when the material under the laser has changed or is about to change. Material removed from the sample can be deflected to avoid deposition onto the laser optics.

20 Claims, 4 Drawing Sheets

(51) Int. Cl.
*B23K 26/14* (2014.01)
*B23K 26/0622* (2014.01)
*B23K 26/348* (2014.01)

(52) U.S. Cl.
CPC .......... *B23K 26/14* (2013.01); *B23K 26/1423* (2013.01); *B23K 26/348* (2015.10); *H01J 2237/2813* (2013.01)

(58) Field of Classification Search
USPC .............. 219/121.69, 121.83, 121.6–121.86; 356/34, 317–9, 326, 341
See application file for complete search history.

(56) References Cited

U.S. PATENT DOCUMENTS

| | | | | |
|---|---|---|---|---|
| 5,024,968 | A * | 6/1991 | Engelsberg | 438/597 |
| 5,099,557 | A | 3/1992 | Engelsberg | |
| 5,204,517 | A * | 4/1993 | Cates | B44D 3/166 134/1 |
| 5,254,832 | A * | 10/1993 | Gartner et al. | 219/121.66 |
| 5,411,918 | A | 5/1995 | Keible et al. | |
| 5,495,107 | A | 2/1996 | Hu et al. | |
| 5,531,857 | A | 7/1996 | Engelsberg et al. | |
| 5,643,472 | A | 7/1997 | Engelsberg et al. | |
| 5,821,175 | A * | 10/1998 | Engelsberg | 438/795 |
| 5,843,363 | A | 12/1998 | Mitwalsky et al. | |
| 5,847,825 | A * | 12/1998 | Alexander | 356/318 |
| 5,874,011 | A | 2/1999 | Ehrlich | |
| 5,958,268 | A | 9/1999 | Engelsberg et al. | |
| 5,990,027 | A | 11/1999 | Mercuri et al. | |
| 6,048,588 | A * | 4/2000 | Engelsberg | 427/554 |
| 6,087,618 | A * | 7/2000 | Wiener-Avnear | G01T 1/20 219/121.6 |
| 6,140,604 | A * | 10/2000 | Somers et al. | 219/121.71 |
| 6,156,030 | A * | 12/2000 | Neev | 606/10 |
| 6,277,651 | B1 * | 8/2001 | Groger | G01N 21/39 257/253 |
| 6,335,208 | B1 | 1/2002 | Lowry | |
| 6,346,352 | B1 * | 2/2002 | Hayden et al. | 430/5 |
| RE37,585 | E * | 3/2002 | Mourou et al. | 219/121.69 |
| 6,503,423 | B1 | 1/2003 | Kitano et al. | |
| 6,627,886 | B1 * | 9/2003 | Shachal et al. | 850/9 |
| 6,710,870 | B1 * | 3/2004 | Marowsky | G01N 21/6452 356/311 |
| 6,727,458 | B2 | 4/2004 | Smart | |
| 6,770,544 | B2 | 8/2004 | Sawada | |
| 6,841,788 | B1 * | 1/2005 | Robinson | G01N 1/32 219/121.69 |
| 6,864,457 | B1 | 3/2005 | Alexander et al. | |
| 6,900,447 | B2 * | 5/2005 | Gerlach et al. | 250/494.1 |
| 6,956,182 | B2 | 10/2005 | Gregory | |
| 6,984,538 | B2 | 1/2006 | Ooi et al. | |
| 7,005,651 | B2 | 2/2006 | Kaga et al. | |
| 7,022,981 | B2 * | 4/2006 | Kato | 250/288 |
| 7,026,600 | B2 | 4/2006 | Jamieson et al. | |
| 7,041,578 | B2 | 5/2006 | Mahle et al. | |
| 7,166,186 | B2 | 1/2007 | Lowry | |
| 7,211,805 | B2 | 5/2007 | Kaga et al. | |
| 7,253,405 | B2 | 8/2007 | Kato | |
| 7,288,739 | B2 | 10/2007 | Gregory | |
| 7,316,936 | B2 * | 1/2008 | Lowry | 438/15 |
| 7,351,282 | B2 | 4/2008 | Yamaguchi | |
| 7,408,179 | B2 * | 8/2008 | Shroff | B23K 26/18 250/504 R |
| 7,420,181 | B2 | 9/2008 | Kaga et al. | |
| 7,449,699 | B1 * | 11/2008 | Adams | H01J 37/228 250/307 |
| 7,504,182 | B2 | 3/2009 | Stewart et al. | |
| 7,582,848 | B2 | 9/2009 | Smart | |
| 7,599,048 | B2 * | 10/2009 | Yoo | G01N 21/718 356/318 |
| 7,616,936 | B2 | 11/2009 | Shaffer et al. | |
| 7,679,030 | B2 | 3/2010 | Smart | |
| 7,741,701 | B2 | 6/2010 | Mahle et al. | |
| 7,750,268 | B2 | 7/2010 | Smart | |
| 7,780,912 | B2 | 8/2010 | Farmer et al. | |
| 7,804,073 | B2 | 9/2010 | Kaga et al. | |
| 7,816,625 | B2 * | 10/2010 | Beck | B23K 26/0608 219/121.71 |
| 8,076,650 | B2 | 12/2011 | Smith et al. | |
| 8,143,063 | B2 | 3/2012 | Farmer et al. | |
| 8,173,929 | B1 * | 5/2012 | Vaissie | 219/121.62 |
| 8,174,691 | B1 * | 5/2012 | Horton | G01N 1/02 356/244 |
| 8,405,054 | B2 | 3/2013 | Smith et al. | |
| 8,409,524 | B2 | 4/2013 | Farmer et al. | |
| 8,687,189 | B2 * | 4/2014 | Agrawal | G01N 21/03 356/318 |
| 8,699,022 | B2 * | 4/2014 | McManus | G01N 21/718 356/316 |
| 2002/0088783 | A1 | 7/2002 | Weber | |
| 2004/0004194 | A1 * | 1/2004 | Amblard | G01N 21/6458 250/458.1 |
| 2004/0089802 | A1 | 5/2004 | Kato | |
| 2004/0188399 | A1 * | 9/2004 | Smart | 219/121.69 |
| 2005/0061779 | A1 * | 3/2005 | Blumenfeld et al. | 219/121.6 |
| 2005/0109747 | A1 | 5/2005 | Alexander | |
| 2005/0145609 | A1 | 7/2005 | Gregory | |
| 2005/0146025 | A1 | 7/2005 | Gregory | |
| 2005/0155957 | A1 | 7/2005 | Gregory | |
| 2005/0167405 | A1 * | 8/2005 | Stoltz | A61B 18/20 219/121.62 |
| 2005/0189503 | A1 * | 9/2005 | Jamieson et al. | 250/559.4 |
| 2006/0084957 | A1 | 4/2006 | Delfyett et al. | |
| 2006/0202130 | A1 | 9/2006 | Kollmer et al. | |
| 2007/0039933 | A1 | 2/2007 | Cheng | |
| 2007/0125958 | A1 * | 6/2007 | Tappel | H01J 37/20 250/441.11 |
| 2007/0210249 | A1 * | 9/2007 | Alberici | 250/305 |
| 2007/0232033 | A1 | 10/2007 | Wieczorek et al. | |
| 2007/0278180 | A1 * | 12/2007 | Williamson et al. | 216/58 |
| 2007/0293020 | A1 | 12/2007 | Pressel et al. | |
| 2007/0296967 | A1 * | 12/2007 | Gupta et al. | 356/318 |
| 2008/0011718 | A1 | 1/2008 | Koops et al. | |
| 2008/0192250 | A1 * | 8/2008 | Yoo | G01N 21/718 356/326 |
| 2009/0127233 | A1 * | 5/2009 | Asano | B23K 26/032 219/121.7 |
| 2009/0273782 | A1 * | 11/2009 | Yoo | B23K 26/03 356/318 |
| 2009/0290151 | A1 * | 11/2009 | Agrawal | G01N 21/03 356/318 |
| 2009/0309018 | A1 | 12/2009 | Smith et al. | |
| 2010/0147812 | A1 * | 6/2010 | Beck | B23K 26/0622 219/121.71 |
| 2010/0320171 | A1 * | 12/2010 | Mao | B82Y 10/00 216/65 |
| 2011/0031397 | A1 * | 2/2011 | Zaykova-Feldman | G01N 23/04 250/307 |
| 2011/0100967 | A1 * | 5/2011 | Yoo | B23K 26/032 219/121.73 |
| 2011/0115129 | A1 * | 5/2011 | Straw | B23K 26/03 264/400 |
| 2011/0163068 | A1 * | 7/2011 | Utlaut | G03F 1/84 216/66 |

FOREIGN PATENT DOCUMENTS

| | | | |
|---|---|---|---|
| EP | 544398 | * | 6/1993 |
| JP | S6072688 | | 4/1985 |
| JP | S60-114753 | | 6/1985 |
| JP | 62-077195 | | 4/1987 |
| JP | 63-144889 | | 6/1988 |
| JP | H01-304648 | | 12/1989 |
| JP | H02119040 | | 5/1990 |
| JP | 03-038833 | | 2/1991 |
| JP | H0338833 | | 2/1991 |
| JP | H05177374 | | 7/1993 |
| JP | 05-261577 | | 10/1993 |

(56) References Cited

FOREIGN PATENT DOCUMENTS

| JP | 06-055283 | 3/1994 |
| --- | --- | --- |
| JP | 06-099292 | 4/1994 |
| JP | 07-005677 | 1/1995 |
| JP | H079182 | 1/1995 |
| JP | 07-090581 | 4/1995 |
| JP | H07-335589 | 12/1995 |
| JP | H08-036982 | 2/1996 |
| JP | 2008-068275 | 3/1996 |
| JP | H09-265931 | 10/1997 |
| JP | 10216664 * | 8/1998 |
| JP | 2001-071164 | 3/2001 |
| JP | 2001-319613 | 11/2001 |
| JP | 2002-175772 | 6/2002 |
| JP | 2002-336986 | 11/2002 |
| JP | 2003-053570 | 2/2003 |
| JP | 2004-014309 | 1/2004 |
| JP | 2004188451 | 7/2004 |
| JP | 2006066398 | 3/2006 |
| JP | 2008-068275 | 3/2008 |
| JP | 2008214039 | 9/2008 |
| JP | H09265931 | 10/2016 |
| WO | WO97/38355 | 10/1997 |
| WO | WO0229853 * | 4/2002 |
| WO | 2009089499 | 7/2009 |
| WO | 2010006188 | 1/2010 |

OTHER PUBLICATIONS

Epifanov, Alexandre, et al., "Statistical Approach to Theory of Electron-Avalanche Ionization in Solids", IEEE Journal of Quantum Electronics, Oct. 1981, pp. 2023-2026, vol. QE-17, Issue 10.

Joglekar, Ajit P, et al., "Optics at critical intensity: Applications to nanomorphing", Proceedings of the National Academy of Sciences, Apr. 20, 2004, pp. 5856-5861, vol. 101, Issue 16.

Lu, C., et al., "End point detection in ion milling processes by sputter-induced optical emission spectroscopy", Journal of Vacuum Science & Technology A: Vacuum, Surfaces, and Films, Apr. 1984, pp. 481-484, vol. 2, Issue 2.

Garcia-Navarro, A., et al., 'Femtosecond laser and swift-ion damage in lithium niobate: A comparative analysis,' Journal of Applied Physics, May 14, 2008, 10 pgs, vol. 103.

Bauerle, 'Laser Processing and Chemistry,' Springer 4th edition, Aug. 31, 2011, 4 pgs.

Notification of Reason(s) of Refusal (Second Office Action), Japanese Application No. JP2011-517574, dated Nov. 1, 2013.

* cited by examiner

METHOD AND APPARATUS FOR LASER MACHINING

This application claims priority from U.S. Provisional Application No. 61/079,304, filed on Jul. 9, 2008, which is hereby incorporated by reference.

TECHNICAL FIELD OF THE INVENTION

The present invention relates to laser micromachining.

BACKGROUND OF THE INVENTION

Removing material from a substrate to form microscopic or nanoscopic structures is referred to as micromachining. Removing material is also referred to as milling or etching. Laser beams and charged particle beams are used for micromachining. Each has advantages and limitations in various applications.

Laser systems use several different mechanisms for micromachining. In some processes, the laser is used to supply heat to a substrate to induce a chemical reaction. The reaction occurs only in the areas where the laser supplies heat, although the heat tends to diffuse to an area larger than the laser beam spot, limiting the resolution of the process. Another mechanism used in laser micromachining is photochemical etching, in which the laser energy is absorbed by individual atoms of the substrate, exciting them into a state in which they can chemically react. Photochemical etching is limited to materials that are photochemically active. Another mechanism used in laser machining is laser ablation, in which energy supplied rapidly to a small volume causes atoms to be expelled from the substrate without heating the substrate. Laser ablation using a fast-pulsed femtosecond laser is described, for example, in U.S. Re. 37,585 to Mourou for "Method for controlling configuration of laser induced breakdown and ablation." Femtosecond laser ablation overcomes some of the limitations of the processes described above.

Charged particle beams include ion beams and electron beams. Ions in a focused beam typically have sufficient momentum to micromachine by physically ejecting material from a surface. Because electrons are much lighter than ions, electron beams are typically limited to removing material by inducing a chemical reaction with an etchant. Ions beams typically are generated by a liquid metal ion source or by a plasma ion source. The spot size of a charged particle beam depends on many factors, including the type of particles and the current in the beam. A beam with low current can typically be focused to a smaller spot and therefore produce a smaller structure than a beam with high current, but a low current beam takes longer to micromachine a structure than a high current beam.

Lasers are typically capable of supplying energy to a substrate at a much higher rate than charged particle beams, and so lasers typically have much higher material removal rates than charged particle beams. The wavelength of lasers, however, is much larger than the wavelength of the charged particles in the charged particle beams. Because the size to which a beam can be focused is limited by the wavelength, the minimum spot size of a laser beam is typically larger than the minimum spot size of a charged particle beam. A. P. Joglekar et al., in "Optics at Critical Intensity: Applications to Nanomorphing," *Proceedings of the National Academy of Science*, vol. 101, no. 16, pp. 5856-5861 (2004) ("Joglekar et al.") shows that features smaller that the wavelength can be achieved using laser pulses shorter than about 10 picoseconds near the critical intensity for ionization. The feature size achievable by Joglekar et al. is still not sufficiently small for many nanotechnology applications.

While a charged particle beam typically has greater resolution than a laser beam and can micromachine an extremely small structure, the beam current is limited and the micromachining operation can be unacceptably slow. Laser micromachining, on the other hand, can be faster, but the resolution is inherently limited by the longer wavelength.

One way to take advantage of both the faster micromachining capability of lasers and the higher precision of charged particle beams is to sequentially process a sample. Sequential processing is described, for example, by M. Paniccia et al. in "Novel Optical Probing and Micromachining Techniques for Silicon Debug of Flip Chip Packaged Microprocessors," *Microelectronic Engineering* 46 (pp. 27-34 1999) ("Paniccia et al."). Paniccia et al. describe a known technique for accessing the active portion of a semiconductor flip chip using laser-induced chemical etching to remove the bulk of material, and then using a charged particle beam for the final, more precise micromachining. A problem with sequential processing is determining when to stop the faster, less precise laser micromachining and begin the more precise charged particle beam processing. If the laser processing is stopped too soon, excess material will remain for removal by the charged particle beam. If the laser processing is stopped too late, the work piece will be damaged. Determining when to stop processing is referred to as "endpointing."

Techniques for determining the end point in charged particle beam processing are known and described, for example, in U.S. Pat. Pub. 2005/0173631 to Ray et al. Such techniques include, for example, applying a varying voltage to the underlying circuit to change the secondary particle emission when the underlying circuit is exposed or nearly exposed. By observing the secondary particle emission, an operator can determine when a feature, such as a buried conductor, is uncovered. Other charged particle beam endpointing processes include, for example, detecting transistor leakage current caused by the charged particles injected by the beam. Laser processing is typically not performed in a vacuum chamber, and so secondary electrons and ions cannot be collected.

In ion beam processing, it is also known to detect photons of a specified frequency emitted from the substrate to determine when the material being impacted by the ion beam has changed. Such a process is described, for example, U.S. Pat. No. 4,874,947 to Ward et al. for "Focused Ion Beam Imaging and Process Control," which is assigned to the assignee of the present application. While Ward et al. describe the detection of photons for endpointing in an ion beam system, this technique is not widely used because the low photon signal is difficult to collect.

SUMMARY OF THE INVENTION

An object of the invention is to improve micromachining by improving control of laser processing.

In accordance with the invention, a laser beam is directed at a sample to remove material from the sample. An end point of laser processing is determined by detecting emissions from the sample.

The foregoing has outlined rather broadly the features and technical advantages of the present invention in order that the detailed description of the invention that follows may be better understood. Additional features and advantages of the invention will be described hereinafter. It should be appreciated by those skilled in the art that the conception and specific embodiment disclosed may be readily utilized as a basis for modifying or designing other structures for carrying out the same purposes of the present invention. It should also be realized by those skilled in the art that such equivalent constructions do not depart from the spirit and scope of the invention as set forth in the appended claims.

BRIEF DESCRIPTION OF THE DRAWINGS

For a more through understanding of the present invention, and advantages thereof, reference is now made to the following descriptions taken in conjunction with the accompanying drawings, in which.

DETAILED DESCRIPTION OF PREFERRED EMBODIMENTS

Figure 1:
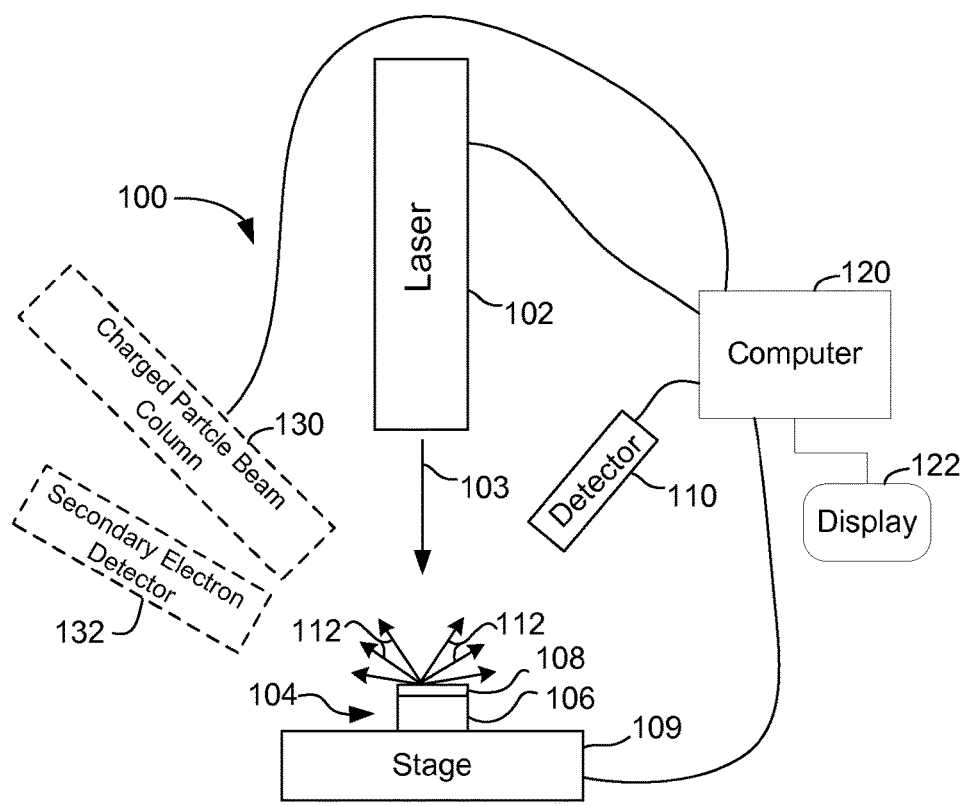
FIG. 1 shows an embodiment of the invention for using emissions from a sample to determine the end point for laser processing.

Various embodiments of the present invention employ various means to enhance laser processing. Embodiments of the invention could use any type of laser, now existing or to be developed, that supplies sufficient fluence. A preferred laser provides a short, that is, nanosecond to femtosecond, pulsed laser beam. Suitable lasers include, for example, a Ti:Sapphire oscillator, a fiber-based laser, or a ytterbium or chromium doped thin disk laser.

Ablation of a substrate by short, that is, nanosecond to femtosecond, laser pulses is accompanied by various emissions from the substrate. Embodiments of the present invention use the emissions from the substrate to determine the progress of the laser micromachining and to determine when a stage of processing is complete. The emission yields and energy spectra of the emitted particles are material-dependent. When a first material is being removed to expose a second material, the emissions will change at the material interface. A detector can determine when emissions change, indicating a change in material under the beam. When emissions characteristic of the second material are detected or when emissions characteristic of the first layer cease, the operator can know the progress of the laser milling operation. Upon a detected change in emissions, the operator or system can alter the process either automatically or manually, for example, by either stopping the processing.

Emissions from the sample include luminescence, e.g., from the infrared (IR) to ultraviolet (UV) to x-ray range), electrons, ions, neutral atoms or molecules, and particles/droplets. The different types of emissions are useful for endpointing in different applications, depending on the type of materials being processed and the processing environment. Processing environments can include, for example, normal atmospheric gas at atmospheric pressure; a high vacuum, that is, a pressure of less than about $10^{-3}$ mbar; a vacuum suitable for an environmental scanning electron microscope, such as a pressure of between about 1 mbar and 50 mbar of various gases, or a controlled gas environment of any suitable gas at any suitable pressure. Ions emitted from the surface can be analyzed directly by mass spectrometry to determine when the material ejected from the surface changes, indicating that a boundary has been reached. Systems for secondary ion mass spectroscopy are common accessories for commercial focused ion beam systems. A second, time-delayed laser beam can be coincidentally focused at the evolving emissions, commonly referred to as the plasma plume, in order to ionize neutral atoms and molecules that exist therein. This second beam can originate from a separate, additional laser or it can originate from the same laser as the primary beam through the use of a standard beam splitter. The interval between the arrival of the primary beam and the arrival of the secondary beam (the time-delay) can be adjusted by adjusting the path length of the secondary beam. The ions resulting from this secondary ionization can then be analyzed by mass spectrometry. Particles and droplets can also be analyzed by inductively coupled plasma mass spectrometry.

When luminescence is used for endpointing, it has the advantage of "looking ahead" of the bottom of the milled hole. That is, atoms just below the surface are excited by the laser pulse because the plasma generated by a laser pulse propagates beyond the volume ablated by the pulse. Photons are therefore emitted from just below the surface, which emissions can provide a more timely indicator of when to cease micromachining. That is, when photons from the second material are used as the indicator, they can be detected shortly before the first material is entirely removed. Similarly, photoemissions from the first material begin to decay shortly before the first material is entirely removed. Endpointing can be performed by detecting a current of photons emitted from the surface, the emission being caused by the laser beam, or by a charged particle beam.

When emissions other than photons are used for endpointing, the substrate typically must be maintained in a low-pressure environment or a vacuum, so that air molecules do not interfere with the collection of the emissions. When photons are used as the indicator, the laser can be operating either in a vacuum, at atmospheric pressure, or in controlled gaseous environments.

Detectors may be general detectors that determine the intensity of one or more types of emissions. In general, a detector counts particles (including references) or measures a particle current, and has a characteristic energy response that defines the detector sensitivity as a function of particle energy. A detector output may be differentiated in time to maximize the ability to detect changes in the signal used for endpointing. Multiple detectors may be used in parallel to detect particles of different energy, charge, mass or charge-to-mass ratio. For example, a broadband photon detector, such as a photomultiplier tube or a semiconductor detector, can be used to measure the intensity of light emitted from the substrate. The detector can be optimized to maximize the material dependence of the endpointing signals. For example, an energy filtering spectrometer can be adjusted to detect a specific signal expected from the buried layer or from the covering layer. In some embodiments, a diffraction grating can be used to disperse the light and a slit can be used to pass light within a given frequency band, which can then be detected by a broadband photon detector. In place of the slit, one or more absorption filters can be used that absorb light characteristic of the covering material and transmit light characteristic of the buried material, or vice versa, to provide a signal when the buried material is exposed or nearly exposed. Alternatively, a diffraction grating can be used to disperse the light onto a charge-coupled device array. The emission spectrum is determined by the strength of the signal measured at different cells in the array. The signals measured at different cells can be used to monitor the intensities of characteristic signals emitted from the covering and buried layers.

Various materials, such as metals, semiconductors, and insulators comprise the layers of materials that are being milled or that are underlying the layers being milled. For example, common materials include Si, $SiO_2$, Cu, Al, Au, Ag, Cr, Mo, Pt, W, Ta, low k dielectrics, high k dielectrics, $Al_2O_3$, SiC, $Si_3N_4$, GaN, AlN, $Al_xGa_{(1-x)}N$, $In_xGa_{(1-x)}N$, GaAs, $In_xGa_{(1-x)}As$, and Ge. When photons are detected as the endpointing indicator, those photons would typically have a wavelength of between 0.01 nm and 1000 nm, and more typically between 300 nm and 800 nm. Suitable detectors, from x-ray detectors for the shorter wavelengths to infrared detectors for the longer wavelengths, can be used. Skilled persons can readily determine the characteristic emission spectra of the various underlying and covering materials. Implementing endpointing is easier when the characteristic signals from the cover material and the underlying material are not close in frequency.

When electrons are used as the endpointing indictor, it is preferable to use a type of electron detector that is currently employed in charged particle beam systems, such as dual beam systems, that include an ion beam column and an electron beam column. Such detectors include, for example, a high efficiency Everhart-Thornley detector that comprises a scintillator that emits light when impacted by an electron, and a photomultiplier that amplifies the emitted light signal. The Everhart-Thornley detector is typically mounted off the laser axis and a voltage relative to the sample is applied to a screen in front of the scintillator to attract electrons emitted by the sample. To exclude electrons below a specified energy level, the sample can be biased to prevent the collection of low energy electrons. The electrons being detected typically have energies of less than about 20 eV, although electrons having energies of up to 1,000 eV may be useful in some applications. In some embodiments, the electrons within a broad energy band are collected with the electron current being characteristic of the substrate material. In other embodiments, the energy of the electrons is determined to characterize the material.

In some embodiments, rather than detecting particles emitted from the sample surface in the vacuum chamber, the current from the sample to ground can be measured. The ground is physically contacted to sample whether directly, for example, through probe, or indirectly, for example, through the sample stage. The current flowing to or from ground is equal to the current leaving the surface of the sample surface under impact from the beam.

FIG. 1 shows a preferred system 100 embodying the present invention. A laser 102 producing a beam 103 is typically operated at a fluence above the threshold for the material being machined. For example, Mourou teaches a preferred beam having energy in the range of 10 nJ to 1 mJ, and a fluence in the range of 0.1 $J/cm^2$ to 100 $J/cm^2$. In one embodiment, a laser beam has an energy of 30 nJ and a fluence of 0.4 $J/cm^2$. The beam 103 is directed to a sample 104, which may include a substrate material 106 and a covering material 108. The sample 104 will typically have several layers of different materials. Sample 104 is typically positioned on a two-axis precision X-Y stage 109 (additional axes may include translation normal to the first two axes, tilt and rotation). A detector 110 detects emissions 112 from the sample 104. The emissions 112 change as the covering material 108 is removed and the substrate material 106 is uncovered. A computer 120 receives a signal from detector 110 and a change in signal indicates that the material under the beam has changed, allowing an operator to monitor the machining progress and take appropriate action or allowing the system to automatically take action, such as automatically stopping laser 102 from further processing. A display 122 connected to computer 120 can provide information to the operator, including an image of the sample 104. As described above, the detector may detect photons, electrons, ions, neutral particles, or droplets that are emitted as a result of the laser ablation or other laser process. System 100 optionally includes one or more charged particle beam columns 130, such as an electron beam column, an ion beam column, or both, which can be used for processing or imaging, as well as a secondary electron detector 132 for forming an image of the sample 104. When charged particle beam column 130 or secondary electron detector 132 are used, the substrate is maintained in a vacuum. In some embodiments, detector 110 can be used to detect a secondary electron signal to form an image, as well as detecting the endpointing signal.

Figure 2:
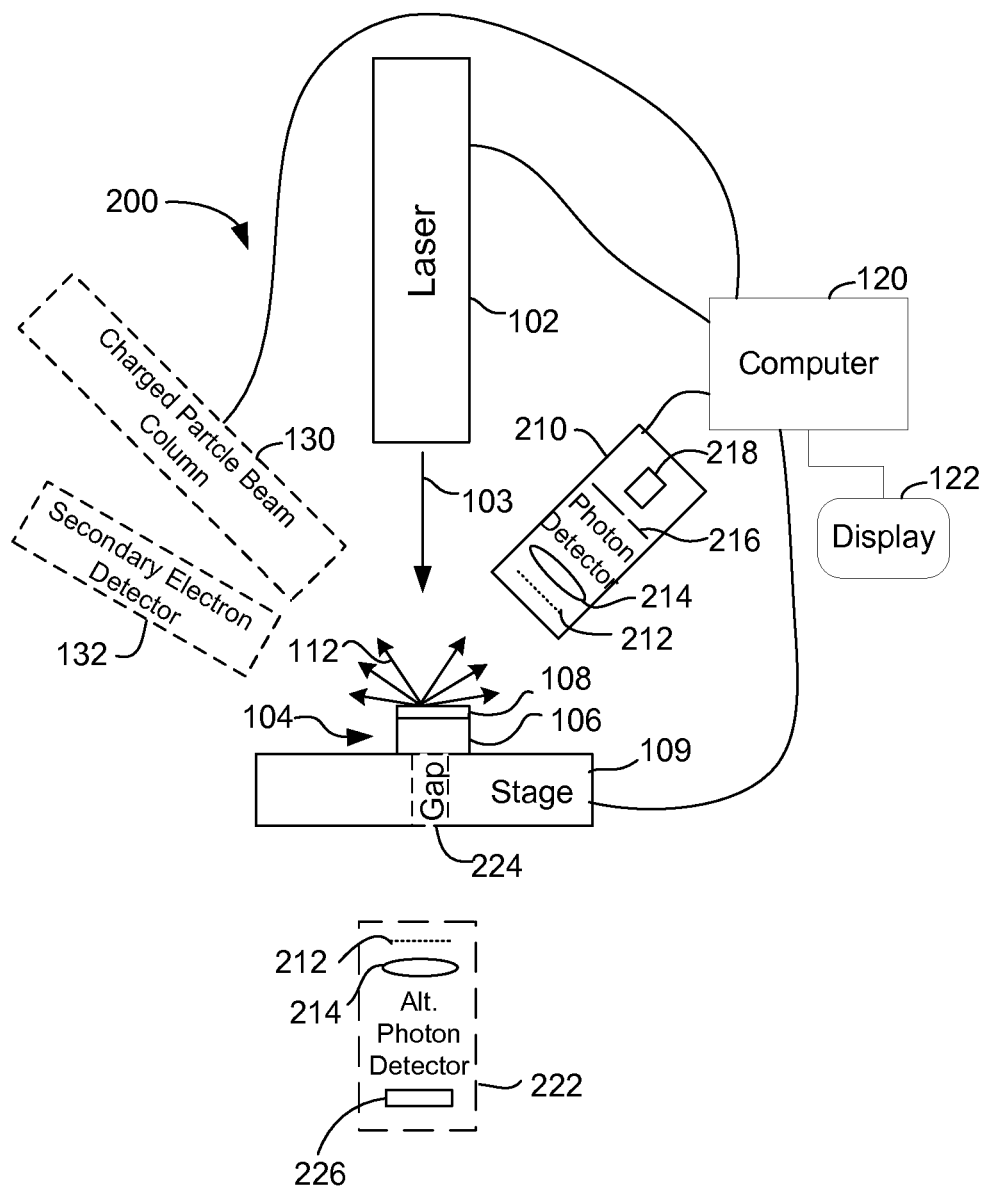
FIG. 2 shows an embodiment of the invention for using photons emitted from the sample to determine the end point for laser processing.

FIG. 2 shows a system 200 in which the detector comprises a photon detector 210, which includes a monochromator, shown schematically as a diffraction grating 212 (alternatively, a prism can be used) that disperses the light from the sample 104, a lens 214 that focuses the dispersed light at different points depending on the frequency, a slit 216 that passes light having a spectrum characteristic of the underlying material, and a photon detector 218 for detecting the light that passes through slit 216. Computer 120 receives the signal from photon detector 210, which signal is interpreted to determine when the material under the laser beam has changed. Computer 120 can, for example, provide a signal to an operator or automatically stops laser 102 from further processing when a change in emissions indicates that a stage of processing is complete. An alternative photon detector 222 is shown positioned under the substrate. Such positioning of the photon detector is useful only when the substrate is transparent to the characteristic light signal, that is, when the band gap of the substrate material is greater than the energy of the photons being detected. When a photon detector below the sample is used, the stage includes a gap or a transparent window 224 for transmitting light. Instead of using a slit and a photomultiplier tube, photon detector 222 is a broad spectrum detector that includes an array 226 of charge-coupled devices (CCDs) that detect the strength of the light signal at different positions that correspond to different frequencies. Either type of detector can be used in either position.

Figure 3:
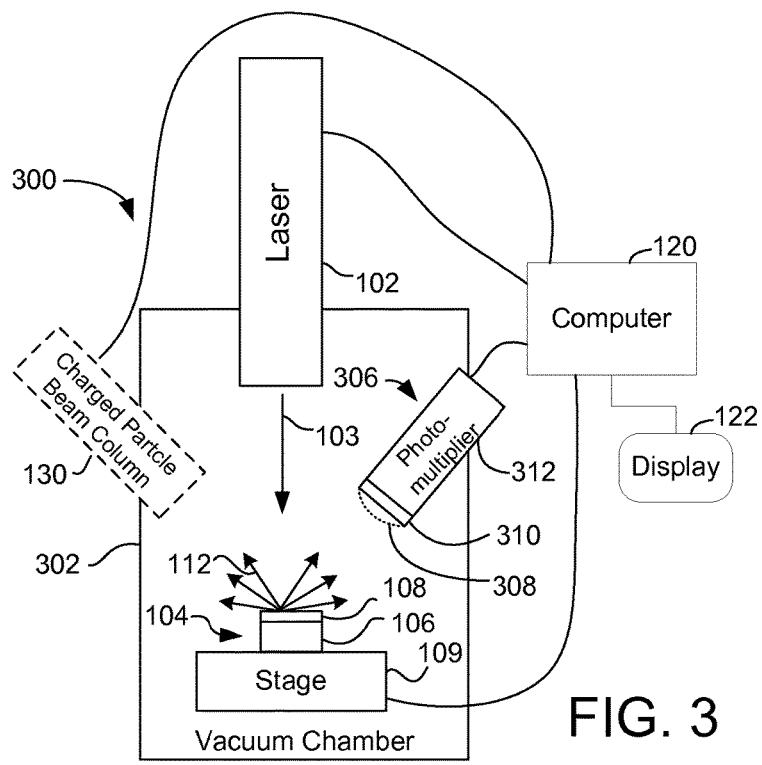
FIG. 3 shows an embodiment of the invention using electrons emitted from the sample to determine the end point for laser processing.

FIG. 3 shows a system 300 for laser processing that detects electrons to determine an end point. In system 300, substrate 104 is positioned in a vacuum chamber 302. An electron detector 306 is an Everhart-Thornley detector including a screen 308, a scintillator 310 and a photomultiplier 312. A low voltage of about 50 volts is applied to the screen 308 and a high voltage of about 10,000 V is applied to the scintillator. Electrons are accelerated from the sample to the screen, and are then accelerated to greater energy to cause the emission of photons in the scintillator. Those photons are converted to electrons and are multiplied in the photomultiplier tube.

Figure 4:
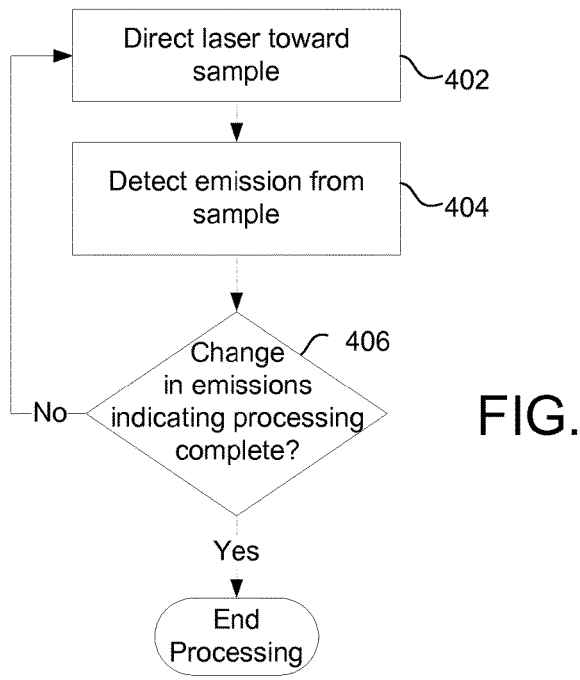
FIG. 4 is a flow chart showing the preferred steps in accordance with an embodiment of the invention for determining the end point for laser processing.

FIG. 4 is a flow chart that shows the operation of the system of FIG. 1. In step 402, the laser is directed toward the substrate. In step 404, emissions from the substrate are detected. In decision block 406, it is determined whether a change in the emissions indicates that the laser micromachining has cut through, or nearly cut through, the covering material. If a change in the emissions indicates that the laser micromachining has cut through, or nearly cut through, the covering material, then the process is altered. If not, the process continues with step 402. Altering the process means, for example, stopping the laser beam, changing a laser parameter, such as the fluence per pulse, changing a gas flow, blanking an electron or an ion beam, or moving a stage that supports the sample. Emissions can be monitored continuously or periodically. If emissions are monitored periodically, the period should be sufficiently small to prevent unacceptable damage to the underlying material if the covering material is completely removed between monitoring periods.

In some embodiments, a charged particle beam, such as an electron beam, can be used to generate an endpointing signal for laser micromachining. The electron beam could be, for example, coincident with the laser beam during laser ablation and used concurrently or sequentially with the laser beam. If cathodoluminescence or backscattered electrons are used as the endpointing signal, the electron beam energy can be adjusted to tune the "look-ahead" capability of the endpointing.

Figure 5:
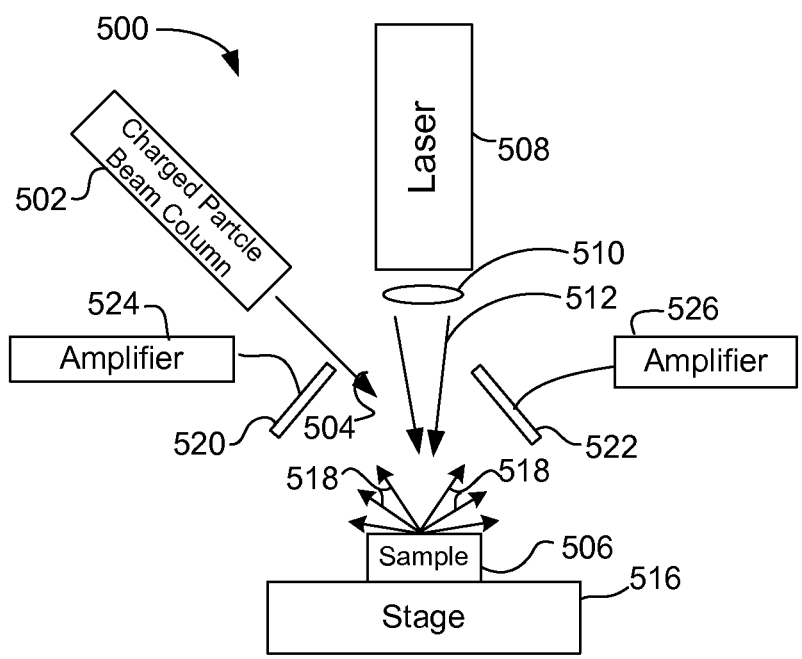
FIG. 5 shows an embodiment that reduces damage to components, such as laser lenses, from secondary particles.

When materials are ejected from a substrate surface, the ejected particles can degrade the optical quality of the laser lens by depositing on the lens or sputtering material from the lens. FIG. 5 shows a system that can reduce damage from secondary particles to a laser lens and other components in the vacuum system. FIG. 5 shows a system 500 that includes a charged particle beam column 502, such as a focused ion beam column, that directs a charged particle beam 504 toward a sample 506. System 500 also includes a laser system 508 having a lens 510 that focuses laser beam 512 onto the sample 506. The laser system beam 512 and the charged particle beam 504 are preferably coincident, that is, they impinge on the same area of the sample 506, with the laser beam typically having a larger spot size on sample 506 than the charged particle beam. While the laser system 508 is shown having a vertical orientation and the charged particle beam column 502 is shown being tilted with respect to the vertical, both systems can be oriented in any suitable orientation.

Sample 506 rests on a precision movable stage 516. When charged particle beam 504 impacts sample 506, secondary particles 518, including electrons and ions, are emitted. The ions can impact on laser lens 510 and reduce its optical quality. Electrodes 520 and 522 are connected to a voltage source (not shown) to create an electric field that deflects the path of secondary particles 518 away from the laser lens 510 to reduce or eliminate damage. The electrodes 520 and 522 can also be used to detect secondary particles 518 for imaging or end-pointing. An amplifier 524 can be connected to electrode 520 to amplify the secondary electron signal. Additionally or alternatively, an amplifier 526 can be connected to an electrode 522 to amplify the positive ion signal for imaging or endpointing.

In a preferred embodiment, an electrical potential of about 300 V to 400 V is applied between electrode 520 and electrode 522. The preferred voltage will vary with the implementation, but will typically be in the range of between a few tens of volts to a few thousands of volts, with a range of a few hundred volts preferred. The shape of the electrode 520 and 522 can be varied to shape the electric field to redirect the particles impacting the laser lenses or other components above the sample. In some embodiments, a single electrode could be used. In some embodiments, a magnetic field could be used in place of electrodes 520 and 522 to deflect charged particles away from sensitive components.

According to preferred embodiments of the present invention a structure is produced or modified by laser beam processing by:
 directing a laser beam toward a sample to produce or modify a structure;
 detecting emissions from the sample caused by incidence of the laser beam;
 determining a property of the emissions, the property being characteristic of the sample; and
 altering the laser beam processing when the emissions indicate a change in the material upon which the laser beam is incident.

According to preferred embodiments of the present invention, altering the laser beam processing includes ceasing to direct the laser beam toward the sample, changing a gas flow, changing a laser parameter such as the fluence per pulse, blanking an electron or an ion beam, or moving a stage that supports the sample.

According to preferred embodiments of the present invention, directing a laser beam toward a sample includes directing a laser beam toward a sample in an environment having a pressure of less than $10^{-3}$ mbar or less than 50 mbar.

According to preferred embodiments of the present invention, determining a property of the emissions includes determining an electron current emitted from the sample. Determining an electron current emitted from the surface includes measuring a current between the sample and a ground directly or indirectly contacting the sample.

According to preferred embodiments of the present invention determining a property of the emissions includes determining the energy of electrons emitted from the sample or detecting photons emitted from the sample. Detecting photons emitted from the sample can include detecting photons having a characteristic wavelength and/or filtering photons having a wavelength other than the characteristic wavelength.

According to preferred embodiments of the present invention determining a property of the emissions includes determining the mass of particles emitted from the surface and/or determining the charge-to-mass ratio of particles emitted from the surface.

Preferred embodiments of the present invention further include ionizing neutral particles before determining the mass of particles emitted from the surface. According to preferred embodiments of the present invention, the method of ionizing neutral particles includes ionizing neutral particles using a laser beam or an electron beam, or directing a time delayed second laser beam to ionize the evolving emissions ejected from the sample by a first laser beam.

According to preferred embodiments of the present invention determining the mass of particles emitted from the surface includes determining the mass using inductively coupled plasma mass spectrometry.

According to preferred embodiments of the present invention directing a laser beam toward a sample includes directing a pulsed laser having a pulse duration of less than a picosecond toward the sample.

According to preferred embodiments of the present invention determining a property of the emissions includes using a narrow band detector to detect only emissions having a specified property, determining a current of the emissions or an energy of the emissions, or determining an energy spectrum of the emissions.

Preferred embodiments of the present invention further include directing a charged particle beam toward the sample.

According to preferred embodiments of the present invention a structure on a sample is produced by:
- directing a laser beam toward a sample to produce or modify a structure;
- directing a charged particle beam toward the sample;
- detecting emissions from the sample caused by incidence of the charged particle beam;
- determining a property of the emissions, the property being characteristic of the sample; and
- altering the laser beam processing when the emissions indicate a change in the material upon which the laser beam is incident.

According to preferred embodiments of the present invention producing a structure includes directing the laser and particle beam to be incident on the sample concurrently or consecutively.

According to preferred embodiments of the present invention, the charged particle beam is an electron beam or an ion beam and detecting emissions from the sample caused by incidence of the charged particle beam includes detecting secondary electrons, backscattered electrons, or transmitted electrons.

According to preferred embodiments of the present invention the charged particle beam is an electron beam and detecting emissions from the sample caused by incidence of the charged particle beam includes detecting photons (including X-rays).

According to preferred embodiments of the present invention detecting emissions from the sample includes detecting emissions from material below the surface.

According to preferred embodiments of the present invention the system for producing or modifying a sample includes:
- a sample holder for holding a sample;
- a fast-pulsed laser for directing a laser beam toward the sample; and
- a detector for detecting emissions from the sample resulting from the impact of the laser beam, the emissions being characteristic of the sample.

According to preferred embodiments of the present invention the system for producing or modifying a sample includes a sample holder which holds the sample in a vacuum.

According to preferred embodiments of the present invention the system for producing or modifying a sample includes an emissions detector which is an electron detector. The emissions detector can also include a mass spectrograph or spectrometer, an inductively coupled plasma mass spectrograph or spectrometer, a photon detector, an Energy Dispersive X-ray Spectroscopy detector, or a Wavelength Dispersive X-ray Spectroscopy detector.

According to preferred embodiments of the present invention, an apparatus for producing or modifying a structure includes:
- a vacuum chamber for holding a sample;
- a laser system for operating on the sample in the vacuum chamber, the laser system including a lens;
- a deflector for deflecting secondary particles emitted from the sample upon the impact of the charged particle or the laser beam away from the laser system lens to prevent damage to the laser system lens from the secondary particles;
- a deflector for deflecting secondary particles emitted from the sample upon the impact of the charged particle or the laser beam away from the charged particle optical column components to prevent damage to the charged particle optical column components from the secondary particles; and/or
- a deflector for deflecting secondary particles emitted from the sample upon the impact of the charged particle or the laser beam away from any components of the apparatus to prevent damage to system the components of the apparatus from the secondary particles.

According to preferred embodiments of the apparatus of the present invention the deflector comprises an electrode, the electrode being electrically connected to an amplifier to determine a secondary particle current, a set of electrodes, or a magnetic deflector.

According to preferred embodiments of the present invention, a method of producing or modifying a structure, comprises:
- providing a system including a vacuum chamber for holding a sample, a charged particle beam column and a laser system including a lens for operating on the sample in the vacuum chamber;
- directing a charged particle beam towards the sample, the impact of the charged particle beam causing the emission of secondary particles;
- providing a field to deflect the secondary particles away from the laser system lens to prevent damage to the laser system lens from the secondary particles;
- providing a field to deflect the secondary particles away from emissions detectors; and
- providing a field to deflect the secondary particles away from components of the charged particle optical column.

According to preferred embodiments of the present invention the method of deflecting the secondary particles away from the lens of the laser system lens includes providing an electrode to produce an electrostatic field to deflect the charged particles or providing any number of electrodes to produce electric fields designed to deflect the charged particles.

Although the present invention and its advantages have been described in detail, it should be understood that various changes, substitutions and alterations can be made herein without departing from the spirit and scope of the invention as defined by the appended claims. Moreover, the scope of the present application is not intended to be limited to the particular embodiments of the process, machine, manufacture, composition of matter, means, methods and steps described in the specification. As one of ordinary skill in the art will readily appreciate from the disclosure of the present invention, processes, machines, manufacture, compositions of matter, means, methods, or steps, presently existing or later to be developed that perform substantially the same function or achieve substantially the same result as the corresponding embodiments described herein may be utilized according to the present invention. Accordingly, the appended claims are intended to include within their scope such processes, machines, manufacture, compositions of matter, means, methods, or steps.

We claim as follows:

1. A method in a charged particle beam system of producing or modifying a structure by laser beam processing and charged particle beam processing, comprising:
- providing a charged particle beam system including a vacuum chamber, a charged particle beam column, and a laser, in which at least a portion of the charged particle beam column is disposed within the vacuum chamber and at least a portion of the laser is disposed within the vacuum chamber;

directing, from the laser, a laser beam toward a sample;

producing or modifying a structure on the sample by means of laser ablation using the laser beam;

detecting emissions from the sample, the emissions being caused by the laser ablation of at least a portion of the sample by the laser beam, in which detecting emissions from the sample comprises detecting electrons, ions, neutral atoms or molecules, particles, or droplets emitted from the sample due to the laser ablation of the sample;

determining a property of the emissions, the property being characteristic of the sample; and discontinuing the laser beam processing when the emissions indicate a change in the material upon which the laser beam is incident;

in response to discontinuing the laser beam processing, processing the sample with a charged particle beam of the charged particle beam system to expose a feature of interest in the sample; and in which the sample is not removed from the vacuum chamber between the steps of producing or modifying a structure on the sample by means of laser ablation using the laser beam and processing the sample with a charged particle beam of the charged particle beam system to expose a feature of interest in the sample.

2. The method of claim 1 in which:
the sample includes a first material over a second material;
directing from a laser a laser beam includes removing the first material; and
determining a property of the emissions includes determining when the first material has been removed.

3. The method of claim 1 in which altering the laser beam processing includes ceasing to direct the laser beam toward the sample, changing a gas flow, changing a fluence per pulse parameter of the laser, blanking an electron or an ion beam, or moving a stage that supports the sample.

4. The method of claim 1 in which directing a laser beam toward a sample includes directing a laser beam toward a sample in an environment having a pressure of less than 50 mbar.

5. The method of claim 1 in which determining a property of the emissions includes determining an electron current emitted from the sample.

6. The method of claim 1 in which determining a property of the emissions includes determining the energy of electrons emitted from the sample.

7. The method of claim 1 in which determining a property of the emissions includes determining the mass of particles emitted from the surface.

8. The method of claim 7 further comprising ionizing neutral particles using a laser beam or using an electron beam to ionize neutral particles before determining the mass of particles emitted from the surface.

9. The method of claim 1 in which directing a laser beam toward a sample includes directing a pulsed laser having a pulse duration of less than a picosecond toward the sample.

10. The method of claim 1 further comprising directing a charged particle beam toward the sample and detecting emissions from the sample caused by incidence of the charged particle beam, the emissions including secondary electrons, backscattered electrons, transmitted electrons, or photons.

11. The method of claim 1 in which determining a property of the emissions includes using a narrow band detector to detect only emissions having a specified property.

12. A method in a charged particle beam system of producing a structure on a sample, comprising:
providing a charged particle beam system including a vacuum chamber, a charged particle beam column, and a laser, in which at least a portion of the charged particle beam column is disposed within the vacuum chamber and at least a portion of the laser is disposed within the vacuum chamber;

directing the laser beam toward a sample in the vacuum chamber;

producing or modifying a structure on the sample by means of laser ablation using the laser beam;

directing a charged particle beam from the charged particle beam column toward the sample;

detecting emissions from the sample caused by incidence of the charged particle beam, in which detecting emissions from the sample caused by incidence of the charged particle beam includes detecting secondary electrons, backscattered electrons, or transmitted electrons;

determining a property of the emissions, the property being characteristic of the sample;

discontinuing the laser beam processing when the emissions caused by incidence of the charged particle beam indicate a change in the material upon which the laser beam is incident;

in response to discontinuing the laser beam processing, processing the sample with the charged particle beam to expose a feature of interest in the sample; and in which the sample is not removed from the vacuum chamber between the steps of producing or modifying a structure on the sample by means of laser ablation using the laser beam and processing the sample with a charged particle beam of the charged particle beam system to expose a feature of interest in the sample.

13. The method of claim 12 in which the laser and particle beam are incident on the sample concurrently.

14. The method of claim 12 in which the laser and particle beam are incident on the sample consecutively.

15. The method of claim 12 in which the charged particle beam is an electron beam.

16. The method of claim 12 in which the charged particle beam is an electron beam and in which detecting emissions from the sample caused by incidence of the charged particle beam includes detecting secondary electrons, backscattered electrons, or transmitted electrons.

17. The method of claim 12 in which the charged particle beam is an electron beam and in which detecting emissions from the sample include detecting emissions from material below the surface.

18. The method of claim 12 in which the charged particle beam is an ion beam.

19. The method of claim 1, in which the charged particle beam is an ion beam and the charged particle beam column is an ion beam column.

20. The method of claim 1, in which the charged particle beam is an electron beam and the charged particle beam is an electron beam column.

* * * * *